United States Patent
Ohashi

(10) Patent No.: US 10,137,417 B2
(45) Date of Patent: Nov. 27, 2018

(54) METHOD FOR MANUFACTURING POROUS BODY

(71) Applicant: Toyota Jidosha Kabushiki Kaisha, Toyota-shi, Aichi-ken (JP)

(72) Inventor: Yoshio Ohashi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 35 days.

(21) Appl. No.: 15/469,922

(22) Filed: Mar. 27, 2017

(65) Prior Publication Data
US 2017/0341033 A1  Nov. 30, 2017

(30) Foreign Application Priority Data
May 26, 2016 (JP) ................. 2016-104994

(51) Int. Cl.
*B01D 69/10* (2006.01)
*B01D 71/02* (2006.01)
*B01D 67/00* (2006.01)
*C04B 38/00* (2006.01)
*B01D 69/02* (2006.01)
(Continued)

(52) U.S. Cl.
CPC ......... *B01D 69/10* (2013.01); *B01D 67/0051* (2013.01); *B01D 69/02* (2013.01); *B01D 69/12* (2013.01); *B01D 71/022* (2013.01); *B01D 71/06* (2013.01); *B01J 20/22* (2013.01); *C04B 38/00* (2013.01)

(58) Field of Classification Search
CPC .... B01D 69/10; B01D 67/0051; B01D 69/02; B01D 71/022; B01D 71/06; B01J 20/22; C04B 38/00
See application file for complete search history.

(56) References Cited

U.S. PATENT DOCUMENTS

2007/0227898 A1  10/2007  Muller et al.
2017/0312734 A1  11/2017  Ohashi

FOREIGN PATENT DOCUMENTS

JP  2002001106 A  1/2002
JP  2011064336 A  3/2011

OTHER PUBLICATIONS

Notice of Allowance dated Feb. 26, 2018; U.S. Appl. No. 15/476,129, filed Mar. 31, 2017; Inventor: Yoshio Ohashi.
(Continued)

*Primary Examiner* — Melvin C. Mayes
*Assistant Examiner* — Michael Forrest
(74) *Attorney, Agent, or Firm* — Dinsmore & Shohl LLP

(57) ABSTRACT

Provided is a method for manufacturing a porous body by which a porous body having a plurality of layers different from each other in pore diameter can be manufactured more easily than before. The method includes heating a raw material solution including a metal ion and an organic ligand to synthesize an interpenetrated metal-organic framework layer; and after synthesizing the interpenetrated metal-organic framework layer, synthesizing a non-interpenetrated metal-organic framework layer under conditions in which concentrations of the metal ion and the organic ligand in the raw material solution and/or a heat temperature are lower than that in synthesizing the interpenetrated metal-organic framework, to obtain a porous body including the interpenetrated metal-organic framework layer and the non-interpenetrated metal-organic framework layer stacked together.

8 Claims, 9 Drawing Sheets

(51) Int. Cl.
    *B01D 71/06*    (2006.01)
    *B01D 69/12*    (2006.01)
    *B01J 20/22*    (2006.01)

(56) References Cited

OTHER PUBLICATIONS

Zhang, JianJun et al., "Temperature and Concentration Control over Interpenetration in a Metal-Organic Material", J. Am. Chem. Soc. 2009, 131, p. 17040-17041.
Office Action dated Oct. 6, 2017 from U.S. Appl. No. 15/476,129, filed Mar. 31, 2017.

METHOD FOR MANUFACTURING POROUS BODY

CROSS-REFERENCE TO RELATED APPLICATIONS

This application claims priority to Japanese Patent Application No. 2016-104994 filed May 26, 2016 which is incorporated herein by reference in its entirety including the specification, drawings, and abstract.

TECHNICAL FIELD

The present disclosure relates to methods for manufacturing a porous body including a plurality of metal-organic framework layers different from each other in pore diameter.

BACKGROUND

Metal-organic frameworks (hereinafter may be referred to as "MOF"), which are porous compounds, have been researched and developed recently as materials having functions of gas storage, separation and the like.

As a technique related to porous compounds, for example Patent Literature 1 discloses a functional element for dehumidification or heat exchange, including a moisture absorbing material that is a porous body of pure silica or a silica-based porous body having uniform nanopore structure, whose pore diameter can be precisely controlled into the range of 0.5 to 5 nm, arranged in a manner that the pore diameter is made small gradually or in a stepwise fashion from the inlet side of the air to be treated to the outlet side. Patent Literature 1 discloses that the control of the pore diameter is carried out by changing the kind of surfactant in a manufacturing process of the porous body of pure silica or the silica-based porous body having nanopore structure.

Patent Literature 2 discloses a method for absorbing and/or storing gas, including bringing the gas to be stored into contact with a MOF electrochemically manufactured under the conditions suitable for absorption of the gas, carrying out absorption of the gas to the MOF, and if appropriate, subsequently changing the above conditions so that the stored gas is released.

Non-Patent Literature 1 discloses synthesis conditions of an interpenetrated MOF and a non-interpenetrated MOF (hereinafter the former may be referred to as "inter MOF" and the latter may be referred to as "non-inter MOF").

CITATION LIST

Patent Literature

Patent Literature 1: JP 2002-1106 A
Patent Literature 2: JP 2011-64336 A

Non-Patent Literature

Non-Patent Literature 1: J. AM. CHEM. SOC. 2009, 131, pp. 17040-17041

SUMMARY

Technical Problem

In manufacturing a porous body including a stack of a plurality of layers different from each other in pore diameter, especially with the technique to control the pore diameters by changing surfactants, which is disclosed in Patent Literature 1, different surfactants are needed to synthesize layers different in pore diameter. That is, in manufacturing a porous body including a plurality of layers different from each other in pore diameter with this technique, there is a drawback that the manufacturing processes get troublesome easily because a heat treatment and removal of surfactant are needed for each layer. In addition, with this technique, silica framework contracts by the heat treatment in forming silica, and the pore diameter and the adsorption property of the mesoporous silica layer synthesized in advance changes when the stack is formed. Thus, it is difficult to control the pore diameter and the adsorption property. Patent Literature 2 only discloses a method for absorbing and/or storing gas with a MOF. Non-Patent Literature 1 only discloses synthesis conditions of an interpenetrated MOF and a non-interpenetrated MOF. Thus, it is difficult to easily manufacture a porous body including a plurality of layers different in pore diameter, even though these techniques are simply combined.

An object of the present disclosure is to provide a method for manufacturing a porous body by which a porous body including a plurality of layers different from each other in pore diameter can be manufactured more easily than before.

Solution to Problem

An inter MOF and a non-inter MOF different in pore diameter can be formed separately from the same materials, by changing the raw material concentration and the synthesis temperature. As a result of intensive research, the inventor of the present disclosure found that it is possible to manufacture a porous body including a plurality of MOF layers (inter MOF layer and non-inter MOF layer) different from each other in pore diameter, by synthesizing an inter MOF layer, thereafter synthesizing a non-inter MOF layer under the conditions of raw material concentration and synthesis temperature lower than the synthesis conditions of the inter MOF layer. The present disclosure has been completed based on this finding.

In order to solve the above problems, the present disclosure is directed to the following embodiments. That is, an embodiment of the present disclosure is a method for manufacturing a porous body including: heating a raw material solution including a metal ion and an organic ligand to synthesize an interpenetrated metal-organic framework layer; and after synthesizing the interpenetrated metal-organic framework layer, synthesizing a non-interpenetrated metal-organic framework layer under conditions in which concentrations of the metal ion and the organic ligand in the raw material solution and/or a heat temperature are lower than that in synthesizing the interpenetrated metal-organic framework, to obtain a porous body including the interpenetrated metal-organic framework layer and the non-interpenetrated metal-organic framework layer stacked together.

With this configuration, it is possible to synthesize each layer of a porous body including an inter MOF layer and a non-inter MOF layer different in pore diameter and stacked together, from the same raw materials. Thus, it is possible to manufacture a porous body more easily than before.

In the present disclosure, the metal ion may be at least one selected from the group consisting of cobalt ion, nickel ion, copper ion, zinc ion, iron ion, and cadmium ion. With this configuration, it is possible to manufacture a porous body more easily than before.

In the present disclosure, the organic ligand may be at least one selected from the group consisting of 2,6-naphthalenedicarboxylic acid, 4,4'-bipyridine, 4,4',4'',4'''-benzene-1,2,4,5-tetrayltetrabenzoic acid, 2,2'-dimethyl-4,4'-bipyridine, 1,4-benzenedicarboxylic acid, and 1,4-di(4-pyridyl)benzene. With this configuration, it is possible to manufacture a porous body more easily than before.

In the present disclosure, the interpenetrated metal-organic framework layer may be synthesized by Solvothermal method, and the non-interpenetrated metal-organic framework layer may be synthesized by Solvothermal method. With this configuration, it is possible to manufacture a porous body more easily than before.

According to the present disclosure, it is possible to provide a method for manufacturing a porous body by which a porous body including a plurality of layers different from each other in pore diameter can be manufactured more easily than before.

DESCRIPTION OF EMBODIMENT

Hereinafter the various embodiments and aspects of the present disclosure will be explained below with reference to the drawings. The embodiments shown below are examples of the present disclosure, and the present disclosure is not limited to the embodiments shown below.

Figure 1:
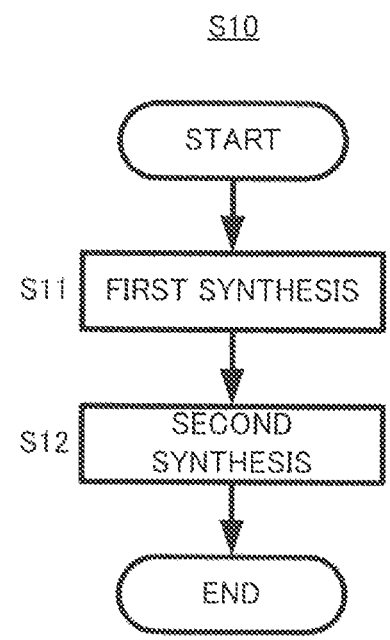
FIG. 1 is a view to explain a method for manufacturing a porous body of the present disclosure.
Figure 2:
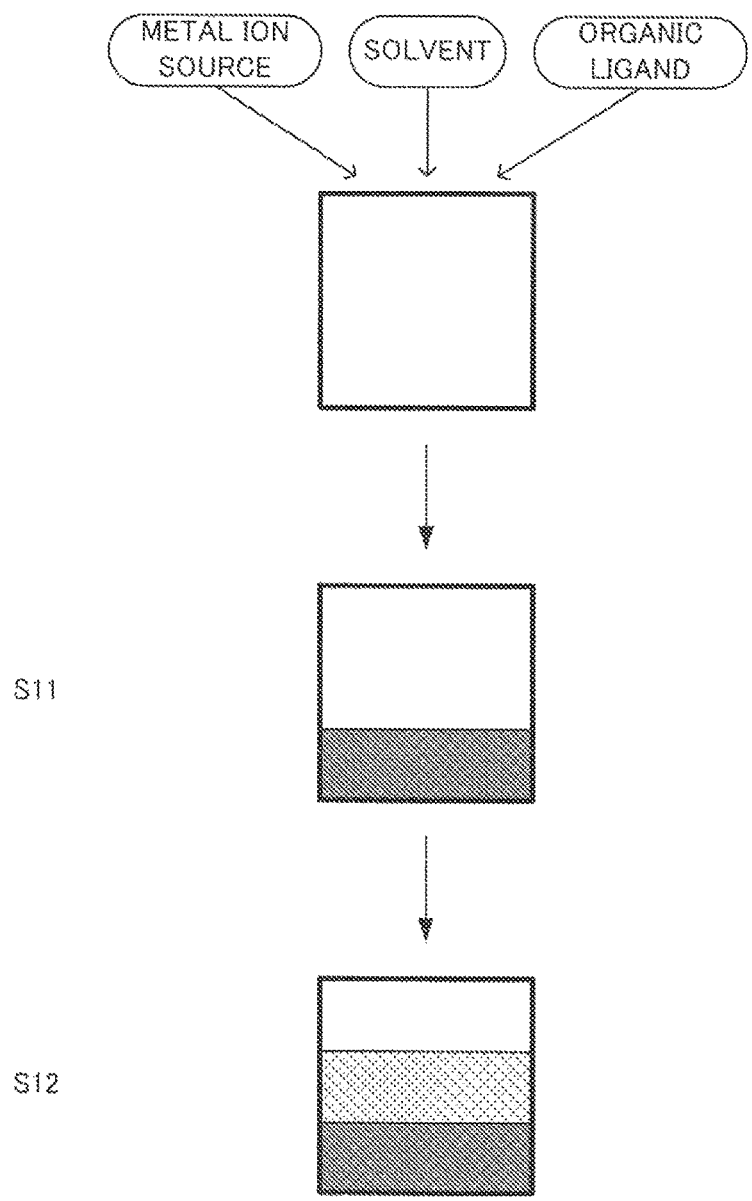
FIG. 2 is a view to explain the method for manufacturing a porous body of the present disclosure.

FIGS. 1 and 2 are views to explain a manufacturing method of the present disclosure. As shown in FIG. 1, a manufacturing method S10 of the present disclosure includes a first synthesis step (S11) and a second synthesis step (S12).

1. First Synthesis Step (S11)

The first synthesis step (hereinafter may be referred to as "S11") is a step of heating a raw material solution including a metal ion and an organic ligand, to synthesize an inter MOF layer. More specifically, S11 is a step of synthesizing a MOF at a raw material concentration and a temperature with which an inter MOF can be synthesized. Here, "raw material concentration" means the concentrations of the metal ion and the organic ligand in a solution in which the metal ion and the organic ligand are dissolved in a solvent.

Figure 3:
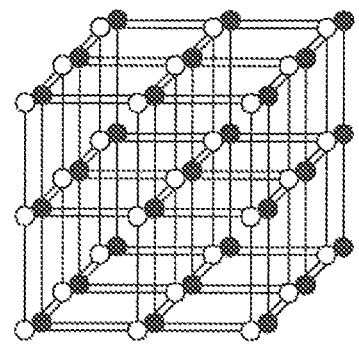
FIG. 3 is a view to explain a configuration example of an interpenetrated metal-organic framework.

FIG. 3 is a view to explain a configuration example of an inter MOF. For the sake of easy understanding that there are a plurality of frameworks, the color of vertexes is shown differently by each framework in FIG. 3. However, the plurality of frameworks that form the inter MOF have the same structure.

As shown in FIG. 3, the inter MOF has a structure in which a plurality of frameworks are intertwined with each other. In order to synthesize the inter MOF, the frameworks need to be intertwined with each other. In order to get the frameworks to be intertwined with each other, their pore size needs to be larger than the size of the substance that forms each vertex of the frameworks (oxide cluster). In order to form a framework of large pore, effective ways are to make the size of the oxide cluster small and to make the substance that forms each side of the frameworks (organic ligand) long. Here, the size of the oxide cluster relates to the metal ion source, and different organic ligands may have different lengths. Thus, in order to synthesize the inter MOF layer, it is necessary to use appropriate raw materials (metal ion source and organic ligand).

Further, the inter MOF is easily synthesized when the raw material concentration is higher than that of the non-inter MOF and when the temperature of the synthesis is higher than in synthesis of the non-inter MOF. Thus, in order to synthesize the inter MOF, it is also necessary to properly control the raw material concentration and the temperature.

S11 is not limited as long as it is a step of using raw materials with which the inter MOF can be synthesized and in which a MOF is synthesized under a raw material concentration condition and a temperature condition with which the inter MOF can be synthesized. In S11, various metal ions, organic ligands and solvents may be used. In the present disclosure, the time of S11, that is, the synthesis time of the inter MOF can be determined based on the state of generation and precipitation of the MOF, which is an insoluble matter, in the solution.

Examples of the metal ion that forms the inter MOF by coordination bond with organic ligand in S11 include $Co^{2+}$, $Ni^{2+}$, $Cu^{2+}$, $Zn^{2+}$, $Fe^{2+}$ and $Cd^{2+}$.

Examples of the metal ion source that can be used in S11 and generates $Co^{2+}$ include cobalt nitrate hexahydrate, cobalt chloride hexahydrate and cobalt acetate tetrahydrate.

Examples of the metal ion source that can be used in S11 and generates $Ni^{2+}$ include nickel nitrate hexahydrate, nickel chloride hexahydrate and nickel acetate tetrahydrate.

Examples of the metal ion source that can be used in S11 and generates $Cu^{2+}$ include copper nitrate trihydrate, copper chloride dihydrate and copper acetate monohydrate.

Examples of the metal ion source that can be used in S11 and generates $Zn^{2+}$ include zinc nitrate hexahydrate, zinc chloride and zinc acetate dihydrate.

Examples of the organic ligand that can be used in S11 and forms the inter MOF by coordination bond with metal ion include 2,6-naphthalenedicarboxylic acid ($H_2NDC$) and 4,4'-bipyridine, (bipy), 4,4',4'',4'''-benzene-1,2,4,5-tetrayltetrabenzoic acid ($H_4BTTB$) and 2,2'-dimethyl-4,4'-bipyridine (DMBPY), and 1,4-benzenedicarboxylic acid (BDC) and 1,4-di(4-pyridyl)benzene.

Examples of the solvent that can be used in S11 and dissolves the above metal ion source and organic ligand include N,N-dimethylformamide (DMF), N,N-diethylformamide (DEF), formic acid, acetic acid, methanol, ethanol, water, and a mixture thereof.

For example, in S11, when zinc nitrate hexahydrate is used as the metal ion source and $H_4BTTB$ and DMBPY are used as the organic ligands, which are dissolved in a mixture liquid of N,N-dimethylformamide (DMF), ethanol, water and concentrated hydrochloric acid, to synthesize the inter MOF layer, the concentration of zinc ion may be in the range of from 0.04 to 0.08 mol/L, the concentration of H$_4$BTTB may be 0.02 to 0.04 mol/L, and the concentration of DMBPY may be 0.02 to 0.04 mol/L as the conditions of raw material concentration. The synthesis temperature may be 105 to 120° C. When the synthesis temperature is 110° C., the time to keep the temperature at 110° C. (synthesis time) may be 48 hours. When these raw materials and solvent are used, the inter MOF layer may be synthesized by Solvothermal method.

2. Second Synthesis Step (S12)

The second synthesis step (hereinafter may be referred to as "S12") is a step of synthesizing a non-inter MOF layer under the conditions of the raw material concentration and/or the synthesis temperature lower than in S11, in the container with the inter MOF layer synthesized in S11 in it, to obtain a porous body including the inter MOF layer synthesized in S11 and the non-inter MOF layer formed on the inter MOF layer.

Figure 4:
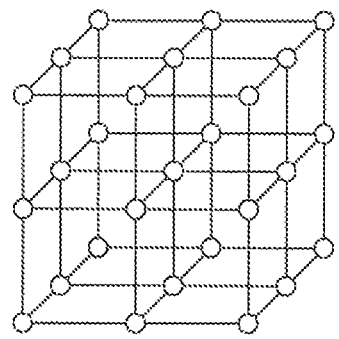
FIG. 4 is a view to explain a configuration example of a non-interpenetrated metal-organic framework.
Figure 5:
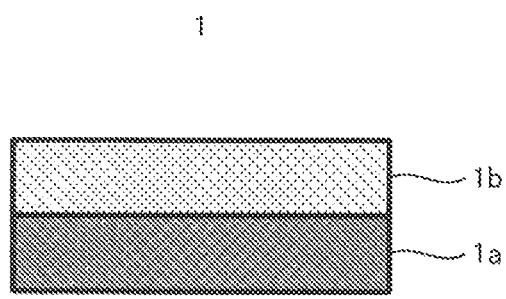
FIG. 5 is a view to explain a configuration example of a porous body manufactured by the present disclosure.

FIG. 4 is a view to explain a configuration example of the non-inter MOF. As shown in FIG. 4, the non-inter MOF is formed of a single (one kind) framework. Thus, compared to the inter MOF, the non-inter MOF has a large diameter and volume of each pore, and has a small density. The non-inter MOF having large pores can adsorb a large amount of substances under a relatively high humidity environment compared to the inter MOF. In contrast, the inter MOF having smaller pores than the non-inter MOF can adsorb a large amount of substances under a relatively low humidity environment compared to the non-inter MOF. Thus, by using a porous body including a stack of the non-inter MOF and the inter MOF as an adsorption material, it is possible to adsorb materials at a wide range of humidity. A configuration example of a porous body that can be manufactured by the present disclosure is shown in FIG. 5. A porous body 1 shown in FIG. 5 includes an inter MOF layer 1$a$ and a non-inter MOF layer 1$b$.

The non-inter MOF having such a characteristic can be synthesized of the same raw materials (metal ion source and organic ligand) and solvent as that of the inter MOF, and is easily synthesized when the raw material concentration is lower than that of the inter MOF and when the temperature is lower than the temperature in the synthesis of the inter MOF. Thus, in order to synthesize the non-inter MOF, it is also necessary to properly control the raw material concentration and the synthesis temperature.

S12 is not limited as long as the raw materials from which the non-inter MOF can be synthesized are used and it is a step of synthesize the MOF in the container with the inter MOF layer synthesized in S11 in it, under the conditions of the raw material concentration and temperature with which the non-inter MOF can be synthesized. In S12, the same metal ion sources, organic ligands, and solvents as in S11 may be used. In the present disclosure, the time for S12, that is, the synthesis time of the non-inter MOF can be determined based on the state of generation and precipitation of the non-inter MOF, which is an insoluble matter, in the solution.

For example, in S12, when zinc nitrate hexahydrate is used as the metal ion source and H$_4$BTTB and DMBPY are used as the organic ligands, which are dissolved in a mixture liquid of DMF, ethanol, water and concentrated hydrochloric acid, to synthesize the non-inter MOF layer, the concentration of zinc ion may be 0.01 to 0.02 mol/L, the concentration of H$_4$BTTB may be 0.005 to 0.01 mol/L, and the concentration of DMBPY may be 0.005 to 0.01 mol/L as the conditions of raw material concentration. The synthesis temperature may be 80 to 90° C. When the synthesis temperature is 90° C., the time to keep 90° C. (synthesis time) may be 96 hours. When these raw materials and solvent are used, the non-inter MOF layer can be synthesized by Solvothermal method.

As described above, in the present disclosure, the inter MOF layer may be synthesized in S11, and the non-inter MOF layer may be synthesized in S12. By synthesizing the non-inter MOF layer in S12 with the container with the inter MOF layer synthesized in S11 in it, it is possible to accumulate the non-inter MOF layer synthesized in S12 on the inter MOF layer synthesized in S11. With this configuration, there is no need of heat treatment and removal of surfactant agent for each layer like the conventional technique. Thus, it is possible to manufacture a porous body including a plurality of layers different from each other in pore diameter more easily than before.

In the above explanation related to the present disclosure, a configuration of synthesis of the inter MOF layer and the non-inter MOF layer in which zinc nitrate hexahydrate is used as the metal ion source, H$_4$BTTB and DMBPY are used as the organic ligands, and they are dissolved in a mixture liquid of DMF, ethanol, water and concentrated hydrochloric acid, is shown as an example. However, the present disclosure is not limited to this configuration.

For example, the present disclosure can also take a configuration in which cobalt nitrate hexahydrate is used as the metal ion source, H$_4$BTTB and DMBPY are used as the organic ligands, and a mixture liquid of N,N-dimethylformamide (DMF), ethanol, water and concentrated hydrochloric acid is used as the solvent.

When the inter MOF layer is synthesized with them, the concentration of cobalt ion may be 0.04 to 0.08 mol/L and the concentration of organic ligand may be 0.02 to 0.04 mol/L as the conditions of raw material concentration. The synthesis temperature may be 105 to 120° C., and the synthesis time may be 6 to 48 hours.

When the non-inter MOF layer is synthesized with them, the concentration of cobalt ion may be 0.01 to 0.02 mol/L and the concentration of organic ligand may be 0.005 to 0.01 mol/L as the conditions of raw material concentration. The synthesis temperature may be 80 to 90° C. and the synthesis time may be 12 to 72 hours. When these raw materials and solvent are used, the inter MOF layer and the non-inter MOF layer can be synthesized by Solvothermal method.

The present disclosure may also take a configuration in which nickel nitrate hexahydrate is used as the metal ion source, H$_4$BTTB and DMBPY are used as the organic ligands, and a mixture liquid of N,N-dimethylformamide (DMF), ethanol, water and concentrated hydrochloric acid is used as the solvent to synthesize the inter MOF layer and the non-inter MOF layer, for example.

When the inter MOF layer is synthesized with them, the concentration of nickel ion may be 0.04 to 0.08 mol/L and the concentration of organic ligand may be 0.02 to 0.04 mol/L as the conditions of raw material concentration. The synthesis temperature may be 105 to 120° C. and the synthesis time may be 6 to 48 hours.

When the non-inter MOF layer is synthesized with them, the concentration of nickel ion may be 0.01 to 0.02 mol/L and the concentration of organic ligand may be 0.005 to 0.01 mol/L as the conditions of raw material concentration. The synthesis temperature may be 80 to 90° C. and the synthesis time may be 12 to 72 hours. When these raw materials and solvent are used, the inter MOF layer and the non-inter MOF layer may be synthesized by Solvothermal method.

The present disclosure may also take a configuration in which nickel nitrate hexahydrate is used as the metal ion source, H$_2$BDC and bipy are used as the organic ligands, and a mixture liquid of N,N-dimethylformamide (DMF), ethanol, water and concentrated hydrochloric acid is used as the solvent, to synthesize the inter MOF layer and the non-inter MOF layer, for example.

When the inter MOF layer is synthesized with them, the concentration of nickel ion may be 0.05 to 0.1 mol/L and the concentration of organic ligand may be 0.02 to 0.05 mol/L as the conditions of raw material concentration. The synthesis temperature may be 110 to 120° C., and the synthesis time may be 6 to 48 hours.

When the non-inter MOF layer is synthesized with them, the concentration of nickel ion may be 0.01 to 0.02 mol/L and the concentration of organic ligand may be 0.005 to 0.01 mol/L as the conditions of raw material concentration. The synthesis temperature may be 80 to 90° C., and the synthesis time may be 12 to 72 hours. When these raw materials and solvent are used, the inter MOF layer and the non-inter MOF layer may be synthesized by Solvothermal method.

EXAMPLES (1) Manufacture of Porous Body

Example

First Synthesis Step

In a Teflon container of 180 mL in volume (Teflon is registered trademark of DuPont), 0.297 g (1 mmol) of zinc nitrate hexahydrate (Zn(NO$_3$)$_2$.6H$_2$O), 0.279 g (0.5 mmol) of 4,4',4'',4'''-benzene-1,2,4,5-tetrayltetrabenzoic acid (H$_4$BTTB), 0.092 g (0.5 mmol) of 2,2'-dimethyl-4,4'-bipyridine (DMBPY), 10 mL of N,N-dimethylformamide (DMF), 10 mL of ethanol (EtOH), 5 mL of water (H$_2$O), and a drop of concentrated hydrochloric acid (HCl) were added and stirred for 1 hour. Thereafter, the container was sealed and heated at 110° C. for 48 hours, whereby an inter MOF layer was synthesized.

Second Synthesis Step

After the liquid was removed from the container used in the first synthesis step, 0.148 g (0.5 mmol) of zinc nitrate hexahydrate (Zn(NO$_3$)$_2$.6H$_2$O), 0.140 g (0.25 mmol) of H$_4$BTTB, 0.046 g (0.25 mmol) of DMBPY, 10 mL of DMF, 10 mL of ethanol (EtOH), 5 mL of water (H$_2$O), and a drop of concentrated hydrochloric acid (HCl) were added in the container and stirred for 1 hour. The container was sealed, and heated at 90° C. for 96 hours, to synthesize a non-inter MOF layer. Whereby, a specimen of Example was obtained.

Comparative Example 1

A specimen of Comparative Example 1 of interpenetrated structure was obtained by synthesizing a first layer and a second layer under the same conditions as that of the first synthesis step in Example.

Comparative Example 2

A specimen of Comparative Example 2 of non-interpenetrated structure was obtained by synthesizing a first layer and a second layer under the same conditions as that of the second synthesis step in Example.

Comparative Example 3

A first and second layers were synthesized under the same conditions as in the above-described Example, except that the first and second layers were synthesized in separate containers. After that, the two layers were stacked together, and 100 MPa of press pressure was added thereto, whereby a specimen of Comparative Example 3 including a stack of an inter MOF layer and non-inter MOF layer was obtained.

(2) Water Vapor Adsorption Curve Measurement

Figure 6:
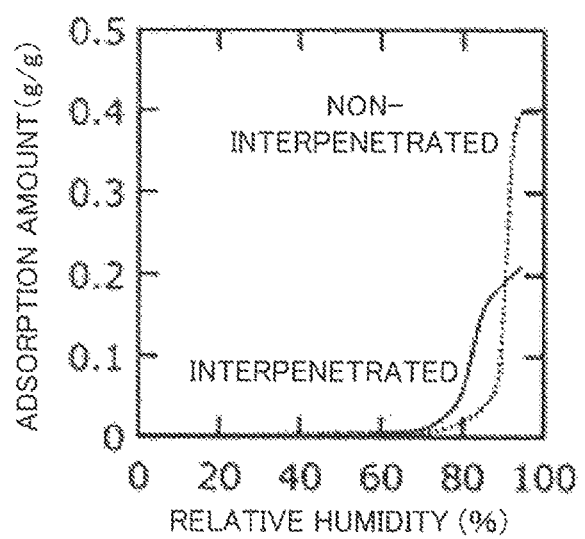
FIG. 6 is a view to show a water vapor adsorption curve.

The specimen of interpenetrated structure synthesized under the same conditions as in the first synthesis step of the Example, and the specimen of non-interpenetrated structure synthesized under the same conditions as in the second synthesis step of Example were dried for 3 hours under a reduced-pressure environment of less than $10^{-2}$ Pa at 120° C. Thereafter, the amount of water vapor adsorption of each specimen was measured at 20° C. of specimen temperature and 0 to 0.95 of relative humidity, by means of a water vapor adsorption amount measurement apparatus (BELSORP-max, manufactured by MicrotracBEL Corp.) The water vapor adsorption curve made on the basis of the measurement results are shown in FIG. 6. The water vapor adsorption amount per unit mass (g/g) of each specimen is taken along the vertical axis, and the relative humidity (%) is taken along the horizontal axis of FIG. 6.

As shown in FIG. 6, the humidity of the specimen of interpenetrated structure at which the adsorption amount rapidly increased was lower than that of the specimen of non-interpenetrated structure.

(3) Water Vapor Adsorption Amount Measurement

The specimens of Example and Comparative Examples 1 to 3 were each cut out into 3 mm×3 mm×2 mm. For each test specimen, four cut out surfaces and the surface on the first layer side were sealed by a silicone adhesive, and the weight was measured. Next, a nitrogen gas stream of 95% in relative humidity was supplied to the surface that was not sealed by the adhesive for 60 minutes. After that, the weight of each test specimen was measured, whereby the amount of water vapor adsorption for each test specimen was obtained. The results of the amounts of water vapor adsorption are collectively shown in Table 1. In Table 1, "INLET SIDE" means the side from which the nitrogen gas stream was supplied, and "OUTLET SIDE" means the opposite side thereto. "ACCUMULATION" written in the section of "STACK" means that the specimen was produced by accumulation of the second layer on the first layer. "PRESSURE BONDING" means that the specimen was produced via a process of press-bonding the first layer and the second layer. "WATER VAPOR ADSORPTION AMOUNT (mg/mL)" is the amount of water vapor adsorption per volume of the specimen. Each test specimen of Example and Comparative Example 3 was cut out in a manner that the interface between the non-interpenetrated structure and the interpenetrated structure, the non-interpenetrated structure, and the interpenetrated structure were included in the test specimen.

TABLE 1

| TEST SPECIMEN | INLET SIDE | OUTLET SIDE | STACK | WATER VAPOR ADSORPTION AMOUNT (mg/mL) |
|---|---|---|---|---|
| EXAMPLE | NON-INTERPENETRATED | INTERPENETRATED | ACCUMULATION | 0.35 |
| COMPARATIVE EXAMPLE 1 | NON-INTERPENETRATED | NON-INTERPENETRATED | ACCUMULATION | 0.29 |
| COMPARATIVE EXAMPLE 2 | INTERPENETRATED | INTERPENETRATED | ACCUMULATION | 0.24 |
| COMPARATIVE EXAMPLE 3 | NON-INTERPENETRATED | INTERPENETRATED | PRESSURE BONDING | 0.28 |

As shown in Table 1, the test specimen of Example to which the present disclosure was applied had a larger amount of water vapor adsorption than the test specimens of Comparative Examples 1 to 3 each manufactured by a method other than the present disclosure. From the results, it was confirmed that it is possible to manufacture a porous body that can adsorb a large amount of water vapor, according to the present disclosure.

Figure 7A:
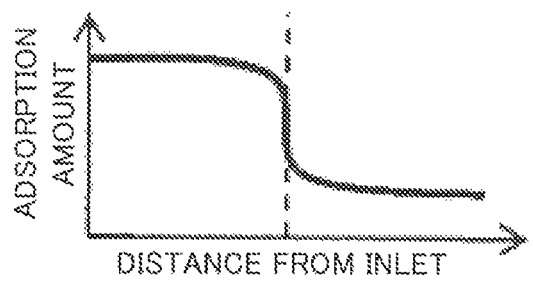
FIG. 7A is a view to explain a relationship between the distance from an inlet and the adsorption amount of a test specimen of Example 1.
Figure 7B:
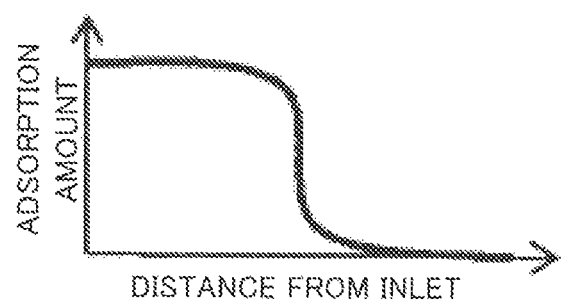
FIG. 7B is a view to explain a relationship between the distance from an inlet and the adsorption amount of a test specimen of Comparative Example 1.
Figure 7C:
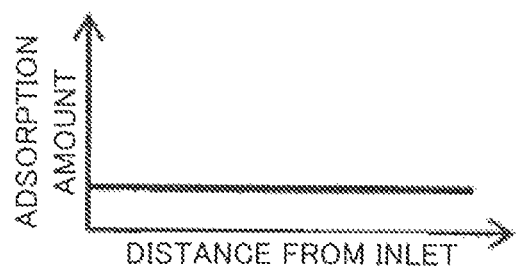
FIG. 7C is a view to explain a relationship between the distance from an inlet and the adsorption amount of a test specimen of Comparative Example 2.

FIGS. 7A to 7C are conceptual diagrams to explain the relationship between the distance from the inlet and the adsorption amount of each test specimen of Example and Comparative Examples 1 and 2. FIG. 7A is a view to explain the relationship between the distance from the inlet and the adsorption amount of the test specimen of Example. FIG. 7B is a view to explain the relationship between the distance from the inlet and the adsorption amount of the test specimen of Comparative Example 1. FIG. 7C is a view to explain the relationship between the distance from the inlet and the adsorption amount of Comparative Example 2.

It is considered that the test specimen of Example, in which the non-inter MOF layer was arranged on the inlet side and the inter MOF layer was arranged on the outlet side, was able to absorb a larger amount of water vapor than other test specimens, because the humidity gradient of the gas to pass through the porous body and the material property were matched.

In contrast, it is considered that the test specimen of Comparative Example 1, whose inlet side and outlet side were both formed of the non-inter MOF layer, adsorbed a less amount of water vapor than the test specimen of Example, because the amount of water vapor adsorption on the outlet side, where the humidity of the gas degrades, was small.

It is considered that the test specimen of Comparative Example 2, whose inlet side and outlet side were both formed of the inter MOF layer, adsorbed a less amount of water vapor than the test specimen of Comparative Example 1, because the amount of water vapor adsorption was small over the entirety of the test specimen.

It is considered the reason of the less amount of water vapor adsorption of the test specimen of Comparative Example 3 produced via the process of pressure bonding was that part of the pores was occluded due to the pressure bonding.

REFERENCES SIGN LIST 1 porous body
1a interpenetrated metal-organic framework layer
1b non-interpenetrated metal-organic framework layer

The invention claimed is:
1. A method for manufacturing a porous body comprising:
heating a raw material solution including a metal ion and an organic ligand to synthesize an interpenetrated metal-organic framework layer; and
after synthesizing the interpenetrated metal-organic framework layer, synthesizing a non-interpenetrated metal-organic framework layer under conditions in which concentrations of the metal ion and the organic ligand in the raw material solution and/or a heat temperature are lower than that in synthesizing the interpenetrated metal-organic framework, to obtain a porous body including the interpenetrated metal-organic framework layer and the non-interpenetrated metal-organic framework layer stacked together.
2. The method for manufacturing a porous body according to claim 1, wherein the metal ion is at least one selected from the group consisting of cobalt ion, nickel ion, copper ion, zinc ion, iron ion, and cadmium ion.
3. The method for manufacturing a porous body according to claim 1, wherein the organic ligand is at least one selected from the group consisting of 2,6-naphthalenedicarboxylic acid, 4,4'-bipyridine, 4,4',4'',4'''-benzene-1,2,4,5-tetrayltetrabenzoic acid, 2,2'-dimetyl-4,4'-bipyridine, 1,4-benzenedicarboxylic acid, and 1,4-di(4-pyridyl)benzene.
4. The method for manufacturing a porous body according to claim 2, wherein the organic ligand is at least one selected from the group consisting of 2,6-naphthalenedicarboxylic acid, 4,4'-bipyridine, 4,4',4'',4'''-benzene-1,2,4,5-tetrayltetrabenzoic acid, 2,2'-dimetyl-4,4'-bipyridine, 1,4-benzenedicarboxylic acid, and 1,4-di(4-pyridyl)benzene.
5. The method for manufacturing a porous body according to claim 1, wherein the interpenetrated metal-organic framework layer is synthesized by Solvothermal method, and the non-interpenetrated metal-organic framework layer is synthesized by Solvothermal method.
6. The method for manufacturing a porous body according to claim 2, wherein the interpenetrated metal-organic framework layer is synthesized by Solvothermal method, and the non-interpenetrated metal-organic framework layer is synthesized by Solvothermal method.
7. The method for manufacturing a porous body according to claim 3, wherein the interpenetrated metal-organic framework layer is synthesized by Solvothermal method, and the non-interpenetrated metal-organic framework layer is synthesized by Solvothermal method.
8. The method for manufacturing a porous body according to claim 4, wherein the interpenetrated metal-organic framework layer is synthesized by Solvothermal method, and the non-interpenetrated metal-organic framework layer is synthesized by Solvothermal method.

* * * * *